United States Patent [19]

Lowe

[11] Patent Number: 5,015,759

[45] Date of Patent: May 14, 1991

[54] PROCESS FOR INCREASING THE DIRECT ESTERIFICATION REACTION RATE OF A DIACID WITH A GLYCOL

[75] Inventor: David J. Lowe, Wilmington, Del.

[73] Assignee: E. I. Du Pont de Nemours and Company, Wilmington, Del.

[21] Appl. No.: 450,911

[22] Filed: Dec. 8, 1989

[51] Int. Cl.$^5$ .............................................. C07C 67/08
[52] U.S. Cl. ..................................... 560/91; 528/279; 528/283; 560/90; 560/94; 560/99; 560/198; 560/204
[58] Field of Search ...................... 560/91, 90, 94, 99, 560/198, 204; 528/279, 283

[56] References Cited

U.S. PATENT DOCUMENTS

| | | |
|---|---|---|
| 4,049,635 | 9/1977 | Cleary .................................. 528/279 |
| 4,680,376 | 7/1987 | Heinze et al. ........................ 528/279 |

FOREIGN PATENT DOCUMENTS

| | | |
|---|---|---|
| 241826A3 | 1/1987 | German Democratic Rep. . |
| 51-37187 | 3/1976 | Japan . |
| 62-225521 | 10/1987 | Japan . |
| 1320621 | 6/1973 | United Kingdom . |

*Primary Examiner*—Jose G. Dees
*Assistant Examiner*—Vera C. Clarke

[57] ABSTRACT

A process for increasing the direct esterification reaction rate between a diacid and 1,4-butanediol and for directly esterifying greater than 95% of the acid ends of the diacid by mixing in any order the diacid, the 1,4-butanediol and a catalyst compound selected from organo-titanium, organo-tin, and organo-zirconium compounds, to form a reaction mixture wherein the ratio of diol:diacid is at least 2:1 and then reacting the reaction mixture at an average temperature ranging between 190° C. to 200° C. for a period of time no longer than sixty minutes. The same process may be followed substituting ethylene glycol for 1,4-butanediol, provided the catalyst compound is added neat, further provided that the average reaction temperature ranges from 190° C. to 200° C., and also provided that the reaction mixture be reacted for a period of time no longer than seventy minutes. The product resulting from this process may be polycondensed or further treated to form a high molecular weight polymer.

18 Claims, No Drawings

PROCESS FOR INCREASING THE DIRECT ESTERIFICATION REACTION RATE OF A DIACID WITH A GLYCOL

BACKGROUND

1. Technical Field

Some high molecular weight polymers, such as, for example, polybutylene terephthalate (PBT) polymers, polyethylene terephthalate polymers (PET), and copolyetheresters, are synthesized from the product obtained from the direct esterification of a diacid, such as terephthalic acid, with a glycol, such as 1,4-butanediol or ethylene glycol. The direct esterification reaction has been known to take as long as 3 to 4 hours to complete. This long reaction time, usually at high temperatures, is undesirable not only because of the length of the processing time required, but also because the likelihood that side reactions will occur increases with time. A particularly undesirable side reaction that can occur is the conversion of hydroxybutyl end groups into tetrahydrofuran (THF). Hydroxybutyl end groups are generated when the acid ends of a diacid are esterified with 1,4-butanediol. A faster reaction time is thus desired in order to reduce the amount of THF generated during a direct esterification reaction between a diacid and 1,4-butanediol.

The present invention is related to significantly increasing the direct esterification reaction rate of a diacid with a glycol, particularly with 1,4-butanediol or ethylene glycol. More specifically, the present invention is a process wherein greater than 95% of the acid ends of a diacid are directly esterified by a glycol, particularly by 1,4-butanediol or ethylene gylcol, in less than seventy minutes. Further, when 1,4-butanediol is the glycol used in a direct esterification reaction, the present invention provides a process whereby less than 5% of the 1,4-butanediol is converted to THF during said reaction. The product of this process can be polycondensed to form a high molecular weight polymer, such as PBT or PET, or it can be further reacted to produce other types of high molecular weight polymers, such as, for example, copolyetheresters.

2. Description of Related Art

U.S. Pat. No. 4,680,376 discloses a process for the continuous production of PBT by the direct esterification of terephthalic acid with 1,4-butanediol in the presence of tin- or titanium-containing catalysts, followed by polycondensation of the direct esterification product. The direct esterification reaction must be conducted under pressure and at temperatures between 225° C. and 260° C. The molar ratio of 1,4-butanediol to terephthalic acid is 2 to 3.8:1. There is no example showing that greater than ninety-five percent of the acid ends of a diacid are directly esterified in less than seventy minutes at atmospheric pressure.

East German Patent 241,826 discloses a process for preparing PBT by esterification of terephthalic acid with butanediol, followed by subsequent polycondensation. The esterification reaction times disclosed are at least 90 minutes and butanediol losses via conversion to THF are reported at 6–11 percent. Further, the reference is focused on increasing the polycondensation reaction rate, not on increasing the direct esterification reaction rate.

U.S. Pat. No. 4,049,635 discloses a process for preparing a polyester by transesterifying 1,4-butanediol and at least one dialkylbenzene dicarboxylate in the presence of a tetraalkyl titanate catalyst and then polycondensing the transesterification reaction product to high molecular weight polymer. The transesterification reaction is conducted over a period ranging from 75 minutes to 3 hours.

British patent specification 1,320,621 discloses a process for the production of fiber-forming poly(tetramethylene terephthalate) comprised of the following three stages: (1) direct esterification, (2) vacuum letdown, and (3) polycondensation. The direct esterification step occurs over a 2 to 8 hour period, under pressure.

Japanese kokai patent no. 76-37187 discloses a method for manufacturing polyester which involves esterifying terephthalic acid and 1,4-butanediol and then subsequently polycondensing the esterification product to form polyester.

Japanese kokai patent no. 87-225521 discloses a method for manufacturing PBT which involves an esterification reaction, said esterification reaction being between a dicarboxylic acid component and a glycol component. The molar ratio of 1,4-butanediol to terephthalic acid should not exceed 1.5:1.

Although each of the above references disclose a process for esterifying a diacid, none disclose the particulars of the present invention. Further, for those cases where the glycol used is 1,4-butanediol, there is no process disclosed wherein less than 5 weight percent of the 1,4-butanediol used in the reaction is converted to THF.

SUMMARY OF THE INVENTION

The present invention relates to a process for increasing the direct esterification reaction rate between a diacid and either 1,4-butanediol or ethylene glycol. It has been discovered by the present invention that greater than 95% of the acid ends of a diacid can be esterified in less than seventy minutes, most preferably in less than twenty minutes, when the diacid and either 1,4-butanediol or ethylene glycol are mixed together in a molar ratio of diol or glycol:diacid of at least 2:1 and are reacted in the presence of from $0.13 \times 10^{-3}$ to $5.2 \times 10^{-3}$ moles of a catalyst compound per mole of the diacid, said catalyst compound being selected from the group consisting of organo-titanium, organo-tin, and organo-zirconium compounds. The reaction temperature when 1,4-butanediol is used ranges, on average at atmospheric pressure, from 180° C. to 245° C. The reaction temperature when ethylene glycol is used ranges, on average at atmospheric pressure, from 190° C. to 200° C. Higher average reaction temperatures can be tolerated if the reaction is conducted under pressure. The catalyst compound should be added neat when ethylene glycol is the dominant glycol component used in the reaction. The product of the direct esterification reaction has use in that, for example, it can be further reacted to form a high molecular weight polymer, such as a copolyetherester, or it can be polycondensed to a high molecular weight polymer, such as PBT or PET.

DETAILED DESCRIPTION OF THE INVENTION

This invention is related to increasing, and thereby improving, the rate at which a diacid is directly esterified by a glycol, particularly 1,4-butanediol or ethylene glycol. Such an increase in the rate at which the direct esterification reaction proceeds is desired in order to reduce the amount of undesirable side reactions that can occur. For example, when 1,4-butanediol is the glycol used, a side reaction that can occur is the conversion of hydroxybutyl end groups into THF. It is desired to reduce the degree to which this side reaction occurs and to thereby decrease the amount of THF generated from these hydroxybutyl end groups. Correspondingly, as the degree to which this side reaction occurs is decreased, the amount of 1,4-butanediol that is recoverable from the reaction will be increased. The direct esterification reaction product is useful as it can be polycondensed or otherwise treated to yield a high molecular weight polymer, such as PBT, PET, or a copolyetherester.

Specifically, the present invention provides a process for significantly increasing the direct esterification reaction rate between a diacid component and a glycol component wherein the glycol component is either 1,4-butanediol or ethylene glycol.

More specifically, the present invention provides a process whereby the direct esterification reaction between a diacid and 1,4-butanediol is "essentially complete" within sixty minutes, preferably within thirty minutes, and most preferably within twenty minutes after the diacid, the 1,4-butanediol, and a catalyst compound are mixed together at reaction temperature, and further whereby the amount of the 1,4-butanediol that is converted to THF is less than 5 weight percent. By the term "essentially complete" it is meant that greater than 95% of the acid ends of the diacid have been esterified. In accordance with this invention, there is provided a process to increase the direct esterification reaction rate between at least one diacid and a 1,4-butanediol and to directly esterify greater than 95% of the acid ends of the diacid comprising the steps of:

(a) mixing the diacid and the 1,4-butanediol in a molar ratio of 1,4-butanediol to diacid of at least 2:1 to form a reaction mixture, (b) heating the reaction mixture to about 180° C., (c) adding from $0.13 \times 10^{-3}$ to $5.2 \times 10^{-3}$ moles of a catalyst compound per mole of the diacid to the reaction mixture, said catalyst compound being selected from the group consisting of organo-tin, organo-titanium, and organo-zirconium compounds, and (d) then reacting the reaction mixture, at atmospheric pressure, at an average reaction temperature ranging from 180° C. to 245° C. for a period of time no longer than sixty minutes from the time at which the catalyst compound was added to the reaction mixture.

Alternatively, and with similar results, the reaction mixture may be prepared in batch-wise fashion; i.e., the diacid, the 1,4-butanediol, and the catalyst compound may be mixed together prior to reaching the reaction temperature range, in which case the reaction will be essentially complete within sixty minutes from the time the reaction mixture reaches, and is maintained within, the average reaction temperature range. By either method, greater than 95% of the diacid acid ends will have been esterified by the 1,4-butanediol within sixty minutes. The resulting esterification product can be isolated, polycondensed to PBT, or otherwise treated by standard techniques to form high molecular weight polymer.

The present invention also specifically provides a process whereby the direct esterification reaction between a diacid and ethylene glycol is "essentially complete" within seventy minutes after a catalyst compound is added to the diacid/ethylene glycol reaction medium. The term "essentially complete" has the same meaning as above, i.e., it means that greater than 95% of the acid ends of the diacid have been esterified. As such, and in accordance with this invention, there is also provided a process to increase the direct esterification reaction rate between at least one diacid and ethylene glycol and to directly esterify greater than 95% of the acid ends of the diacid comprising the steps of:

(a) mixing the diacid and the ethylene glycol in a molar ratio of ethylene glycol to diacid that is at least 2:1 to form a reaction mixture, (b) heating the reaction mixture to about 180° C., (c) adding from $0.13 \times 10^{-3}$ to $5.2 \times 10^{-3}$ moles of a neat catalyst compound per mole of the diacid, said neat catalyst compound being selected from the group consisting of organo-titanium, organo-tin, and organo-zirconium compounds, and (d) reacting the reaction mixture, at atmospheric pressure, at an average reaction temperature ranging between 190° C. to 200° C. for a period of time no longer than seventy minutes from the time at which the catalyst compound was added to the reaction mixture.

Alternatively, and with similar results, the reaction mixture may be prepared in batch-wise fashion; i.e., the diacid, the ethylene glycol, and the catalyst compound may be mixed together prior to reaching the reaction temperature range, in which case the reaction will be essentially complete within seventy minutes from the time the reaction mixture reaches, and is maintained within, the average reaction temperature range. By either method, greater than 95% of the diacid acid ends will have been esterified by the ethylene glycol within seventy minutes. The resulting esterification product can be isolated, polycondensed to PET, or otherwise treated by standard techniques to form high molecular weight polymer.

The diacid component used in the process of the present invention is preferably, though not necessarily, aliphatic or aromatic in nature. Examples of suitable aromatic diacid components include isophthalic acid and terephthalic acid. Examples of suitable aliphatic diacid components include adipic acid, sebacic acid, and dodecanedioic acid. The preferred diacid components are adipic acid and terephthalic acid with the most preferred being terephthalic acid. The diacid component may also be a mixture of more than one aromatic diacid or more than one aliphatic diacid. It further can be a mixture of an aromatic diacid and an aliphatic diacid. The diacid components useful in the present invention are commercially available or can be prepared by techniques known in the art.

It is believed that the direct esterification of the diacid component proceeds as the diacid component dissolves in the glycol component. Such dissolution is facilitated as the surface area of the diacid component is increased. One way to increase the surface area of the diacid component is to decrease the particle size of the diacid component. While it is not necessary for the diacid component to have a very small particle size in order for the reaction to proceed, it may be advantageous to grind the diacid component to smaller particles. Further, the process should be conducted with sufficient agitation to keep the diacid component from settling out of the reaction mixture.

The glycol component used in the process of the present invention is either 1,4-butanediol or ethylene glycol. 1,4-butanediol is a commercially available chemical. It can be used alone or as a mixture with other diols, provided that the 1,4-butanediol component is the dominant component in the mixture. Ethylene glycol is a commercially available, polymer grade chemical. It can be used alone or as a mixture with other diols provided that the ethylene glycol is the dominant component in the mixture. Both 1,4-butanediol and ethylene glycol, if not obtained from commercial sources, can be prepared by techniques readily available to those skilled in the art.

In order for the direct esterification to proceed by the process of the present invention, the molar ratio of the glycol component (or components) to the diacid component (or components), must be 2:1 or greater, preferably it is between 4:1 to 6:1, and most preferably it is about 5:1. A molar ratio of glycol to diacid of greater than 6:1 is expected to yield the same type of results obtained with molar ratios of glycol to diacid ranging between 3:1 and 6:1; however, with current techniques, it may not be practical to proceed with such an excess of glycol due to the time and effort that would be required to separate the unreacted glycol, which was in excess, from the direct esterification reaction product.

The catalyst compound used in the process of the present invention is selected from the group consisting of organo-titanium, organo-tin, and organo-zirconium compounds. Examples of suitable catalyst compounds include tetraalkyl titanates, especially tetrabutyl titanate, and alkyl stannic acids, especially n-butylstannic acid, along with anhydrides of alkylstannic acids. The preferred catalyst compounds are tetrabutyl titanate and n-butylstannic acid. The most preferred catalyst compound is tetrabutyl titanate.

For reactions wherein 1,4-butanediol is the dominant glycol component, the catalyst compound can be added to the reaction mixture as a solution in, for example, 1,4-butanediol, or it can be added neat. For reactions wherein ethylene glycol is the dominant glycol component, the catalyst compound should be added neat. The catalyst compound can be added simultaneously with the diacid component and the glycol component or it can be preferably added after the diacid component and the glycol component have been mixed together and have been heated to reaction temperature or near reaction temperature. The amount of catalyst compound added to the process of the present invention ranges from $0.13 \times 10^{-3}$ to $5.2 \times 10^{-3}$ moles of catalyst compound per mole of the diacid component. Preferably, it ranges from $0.13 \times 10^{-3}$ to $2.6 \times 10^{-3}$ moles of catalyst compound per mole of the diacid component. Most preferably, it ranges from $0.39 \times 10^{-3}$ to $1.7 \times 10^{-3}$ moles of catalyst compound per mole of the diacid component.

For best results, when the glycol component is 1,4-butanediol, the average reaction temperature at which the process of the present invention should be conducted ranges, at atmospheric pressure, from 180° C. to 245° C., preferably from 220° C. to 230° C. When the glycol component is ethylene glycol, then for best results, the average reaction temperature at which the process of the present invention should be conducted ranges, at atmospheric pressure, from 190° C. to 200° C. In either case, higher temperatures, which generally result in faster reaction times, can most likely be tolerated if the process is conducted under pressure. When 1,4-butanediol is the glycol of choice, and further when the reaction is conducted under pressure, it is recommended that the average reaction temperature not exceed 270° C. Further, when the process is conducted under pressure, it is, of course, advantageous to provide a means by which water that is generated during the direct esterification reaction can be removed.

The reaction of the process of the present invention may be conducted by any of several known methods. The preferred method of carrying out the reaction process is by use of a batch reactor. In such a case, the diacid component and the glycol component would preferably be added simultaneously to the batch reactor at heated, with stirring, near reaction temperature, or, alternatively, the glycol component would be charged into the batch reactor, heated to near reaction temperature, and then the diacid component would be added to the batch reactor. The catalyst compound can be added to the reactor with the initial charge of reactants. Preferably, it is added after the diacid component and the glycol component have been mixed together and heated to the reaction temperature or near the reaction temperature. The reaction mixture should be thoroughly and constantly agitated to insure maximum conversion. When the glycol component is 1,4-butanediol, the direct esterification reaction is essentially complete within one hour and in most cases, is essentially complete within 20 minutes. When the glycol component is ethylene glycol, the direct esterification reaction is essentially complete within seventy minutes.

Once the direct esterification reaction, as done in the batch reactor, is essentially complete, the resultant product can be isolated by standard techniques or it can be further mixed or reacted with other materials by standard techniques or it can be polycondensed to a high molecular weight polymer by standard techniques. As an example, the resultant product, made from a diacid and 1,4-butanediol, can be polycondensed by any of the three methods described below.

By the first method, the polycondensation polymerization is conducted in the same batch reactor that contains the direct esterification product. Specifically, the temperature inside the reactor would be raised to at least 235° C., preferably 250° C. to 260° C., and maintained until the polycondensation polymerization is complete. Temperatures higher than 260° C. are acceptable for the polycondensation polymerization only if the polymer being produced will not degrade at such temperature. The polycondensation polymerization should be conducted with vacuum in order to remove unreacted glycol component and also essentially all of the glycol that is produced during the polycondensation polymerization reaction. In a commercial application, where higher temperatures may be necessary in order to remove the unreacted glycol component or the glycol generated during the polycondensation reaction, it may be advantageous to include heat exchangers, or other additional devices that are capable of providing extra heat, on the batch reactor, preferably on the outside of the batch reactor or attached thereto. Use of a heat exchanger inside the batch reactor may be disadvantageous since the high molecular weight polymer may be difficult to remove therefrom. The glycol can be collected and recovered from the batch reactor in accordance with known techniques and can further be recycled back to the reactor by standard techniques.

Alternatively, by the second method, the polycondensation polymerization is conducted by following a semi-continuous process. In such a case, a batch reactor is used as described previously for making the product of the direct esterification reaction between 1,4-butanediol and a diacid. At the end of the direct esterification reaction, the entire direct esterification reaction mixture in the batch reactor is passed through a heat exchanger at a temperature of about 100° C. to 150° C. in order to cool the direct esterification reaction mixture. Cooling of the reaction mixture would be necessary in order to reduce any side reactions, such as conversion of butanediol to THF, that can occur when the mixture is held at a high temperature. The cooled direct esterification reaction mixture then flows into a storage apparatus, such as a surge tank, from which it would continuously flow out of such apparatus and into a standard apparatus designed for a continuous process, such as a wiped film evaporator, wherein the cooled reaction mixture would be heated to at least 235° C., preferably 250° C. to 260° C., under vacuum, and the reaction mixture would be polycondensed to high molecular weight polymer. During the polycondensation polymerization, the unreacted glycol component and any glycol generated during the polycondensation polymerization would be simultaneously removed and collected. The collected glycol can be recovered by any of several known methods and can be fed backwards into the reaction process for recycle by standard techniques.

Finally, as a third alternative, the polycondensation polymerization can be conducted by following a continuous process. In such a process, the components (diacid, 1,4-butanediol, and catalyst) are continuously fed into a first stirred reactor having an average reaction temperature ranging between 180° C. to 245° C. The components are stirred to form the direct esterification reaction mixture. The direct esterification reaction mixture, which contains both unreacted diacid component and unreacted glycol component, along with direct esterification reaction product, then flows from the first stirred reactor into a second stirred reactor having an average temperature of 180° C. to 245° C., where the direct esterification reaction continues. The direct esterification reaction mixture from the second stirred reactor can, if desired, flow into a third stirred reactor. The direct esterification reaction will be essentially complete in less than sixty minutes. After the direct esterification reaction is essentially complete, the direct esterification reaction mixture next flows into one or more apparatus, such as wiped film evaporators, where essentially all of the unreacted glycol component is removed and collected and where, if desired, the direct esterification product is polycondensed to high molecular weight polymer. The collected glycol can be recovered and recycled by standard techniques.

It should be noted that in the process of the present invention, other additives, ingredients, modifiers, such as antioxidants, that are commonly used in such processes may be included.

EXAMPLES

In the following examples, there are shown specific embodiments of the present invention and certain comparisons with embodiments of control experiments where one or more of the parameters discussed above was chosen outside the range defining the limits of the present invention. All parts and percentages are by weight and all temperatures are in degrees Celsius unless otherwise specified. Measurements not originally in SI units have been so converted and rounded where appropriate.

The compositions of the examples each contained a glycol component, a diacid component, and, in most cases, a catalyst compound. The diacid component was one of the following:

TPA = commercial grade terephthalic acid
AA = commercial grade adipic acid The glycol component was one of the following:
BDO = 1,4-butanediol (technical grade, greater than 99.3% pure)
EG = ethylene glycol (greater than 99% pure) The catalyst component was one of the following:
A = 5 weight percent tetrabutyl titanate in butanediol
B = tetrabutyl titanate (neat)
C = n-butylstannic acid (neat)
D = 5 weight percent tetrabutyl titanate in ethylene glycol.
E = 75 weight percent tetrapropyl zirconate in propyl alcohol Unless specified otherwise, all examples were run by charging the glycol component and the diacid component into a round bottom flask equipped with a condenser, thermometer, stir bar, and distillate collecting flask in order to create a reaction mixture. TABLE IA, below lists the amount of each component used for each example. A slight flow of nitrogen was provided to protect the reaction mixture from oxygen. The reaction mixture was then stirred and heated in an oil bath to near reaction temperature. Unless specified otherwise, the catalyst compound was added at or near reaction temperature. The specific temperature at which the catalyst compound was added for each example is detailed in TABLE IB, below. After the catalyst compound was added, the temperature of the reaction was maintained within the range detailed in TABLE IB, below. The temperature range reported includes the temperature at which the catalyst compound was added for each example unless stated otherwise. Also reported in TABLE IB, below, is the average temperature of the reaction mixture for each example, said average starting from and including the temperature at which the catalyst compound was added to the reaction mixture and ending when the oil bath was removed from the reaction flask, unless stated otherwise. Unless specified otherwise, all reactions were run at atmospheric pressure. All times are reported from the time the catalyst was added to the reaction mixture, unless otherwise stated. Samples were extracted from the reaction medium periodically throughout the reaction. The time reported for each extracted sample is the time that passed since the catalyst compound was added to the reaction mixture, unless stated otherwise.

The extracted samples were tested for acidity by the potentiometric titration method described below. Samples (0.6–0.7 grams) weighed to the nearest 0.0001 g, were dissolved in 50 ml of warm (about 100° C.) o-cresol. If the carboxyl levels were anticipated to be less than 10 meq COOH/kg, 2.0 g of sample was used. When the sample was dissolved, 50 ml of o-dichlorobenzene was added and the solution was cooled to room temperature. After several minutes, 5 ml of 10% lithium chloride in methanol were added. A blank control (B) was treated similarly. The sample was titrated with 0.03 normal potassium hydroxide in ethanol. A Brinkman Metrohm 636 Titro processor was used with a Brinkman/Metrohm E635 Dosimat and 10 ml burette as auxiliary equipment. A Metrohm model combination EA120 combination glass/calomel electrode was used with the standard aqueous potassium chloride filling replaced by ethanolic lithium chloride. Acid end group concentration was calculated as follows:

$$A = [(C-B) * N * 1000]/S$$

where
A = terminal acidity in milliequivalents/kg
C = the amount of the sample titer (ml)
N = the normality of the potassium hydroxide solution
S = the sample weight (g)
1000 = units of g/kg.

Acid conversion was determined by the following formula:

$$\frac{[(1*10^6) - (A*[\text{MW diacid} + (B*\text{MW glycol})]/2))]}{[(1*10^6) - (A*18)]} *100$$

where
A = acidity in milliequivalents/kg (as determined above)
B = the molar ratio of glycol:diacid
MW = molecular weight

EXAMPLES 1-9

Direct Esterification of a Diacid at Varying Glycol:Diacid Ratios and Controls

Examples 1-7.5 relate to various examples of the process of the present invention wherein the ratio of the glycol:diacid differed in each example and wherein the glycol component was 1,4-butanediol. Examples C1-C2 are control examples. The compositions are described in TABLE IA, below. The results are reported in TABLE IIA, below. Example C1 was a control example wherein no catalyst compound was used in the process. Times reported are measured from the time catalyst was added to the reaction mixture, unless otherwise specified. The percent of diacid ends esterified after sixty minutes was 71.8. In Example C2, the ratio of glycol:diacid was 1.5:1 and the percent of diacid ends esterified after sixty minutes was 93. In Examples 1-5, the ratio of glycol:diacid was varied from a minimum of 2:1 to a maximum of 5:1. Catalyst compound was the same for Examples 1-5. In each case, after only a 30 minute reaction time, greater than 95% of the diacid ends were esterified. For Examples 2-5, greater than 99% of the diacid ends were esterified after only a 20 minute reaction time. In Examples 6 and 7.5, the catalyst compound was varied. Greater than 95% of the diacid ends were esterified within a 60 minute reaction time.

Examples 8-9 and C3-C4 relate to various examples wherein the glycol component was ethylene glycol. The compositions are described in TABLE IA, above. The results are detailed in TABLE IIB, below. In Examples C3-C4, the catalyst added was tetrabutyl titanate in an ethylene glycol solution. The acid conversion after eighty minutes was 76% for Example C3 and 84% for Example C4. In contrast, for Examples 8 and 9, the catalyst was added neat and in both cases, greater than 95% of the diacid acid ends were converted within seventy minutes.

TABLE IA

COMPOSITIONS USED IN THE EXAMPLES

| Eq. | Glycol (g) | Diacid (g) | Catalyst Compound | Catalyst Concentration[1] | Ratio Glycol:Diacid |
|---|---|---|---|---|---|
| C1 | 17.3 BDO | 6.4 TPA | — | — | 5:1 |
| C2 | 10.5 BDO | 13.4 TPA | 0.445 ml A | 0.80 | 1.5:1 |
| 1 | 12.2 BDO | 11.6 TPA | 0.445 ml A | 0.93 | 2:1 |
| 2 | 14.4 BDO | 9.1 TPA | 0.445 ml A | 1.18 | 3:1 |
| 3 | 15.8 BDO | 7.5 TPA | 0.445 ml A | 1.44 | 4:1 |
| 4 | 16.8 BDO | 6.4 TPA | 0.445 ml A | 1.70 | 5:1 |
| 5 | 18.0 BDO | 6.0 AA | 0.445 ml A | 1.60 | 5:1 |
| 6 | 17.1 BDO | 6.4 TPA | 8.8 mg C | 1.09 | 5:1 |
| 7 | 17.3 BDO | 6.4 TPA | 3.13 mg C | 0.39 | 5:1 |
| 7.5 | 17.3 BDO | 6.4 TPA | 0.028 g E | 1.70 | 5:1 |
| C3 | 14.9 EG | 8.2 TPA | 0.400 ml D | 1.32 | 5:1 |
| C4 | 14.9 EG | 8.2 TPA | 0.400 ml D | 1.32 | 5:1 |
| 8 | 15.3 EG | 8.2 TPA | 13.6 mg C | 1.32 | 5:1 |
| 9 | 14.9 EG | 8.2 TPA | 0.022 ml B | 1.32 | 5:1 |
| 10 | 16.8 BDO | 6.4 TPA | 0.445 ml A | 1.70 | 5:1 |
| 11 | 17.3 BDO | 6.4 TPA | 0.023 ml B | 1.70 | 5:1 |
| 12 | 17.1 BDO | 6.4 TPA | 8.8 mg C | 1.09 | 5:1 |
| C5 | 16.8 BDO | 6.4 TPA | 0.445 ml A | 1.70 | 5:1 |
| 13 | 16.8 BDO | 6.4 TPA | 0.445 ml A | 1.70 | 5:1 |
| 14 | 16.8 BDO | 6.4 TPA | 0.445 ml A | 1.70 | 5:1 |
| 15 | 16.8 BDO | 6.4 TPA | 0.445 ml A | 1.70 | 5:1 |
| 16 | 16.8 BDO | 6.4 TPA | 0.445 ml A | 1.70 | 5:1 |

[1]Units of catalyst concentration = (moles catalyst compound/mole diacid) × $10^{-3}$

TABLE IB

REACTION CONDITIONS

| Eq. | Total Rxn Time[1] (min.) | Temp. at Which Catalyst Added (°C.) | Rxn Temp. Range[2] (°C.) | Avg. Temp.[3] (°C.) |
|---|---|---|---|---|
| C1[4] | 75 | — | 215-237 | 229 |
| C2 | 60 | 226 | 217-255 | 235 |
| 1 | 60 | 227 | 222-254 | 241 |
| 2 | 66 | 217 | 217-243 | 236 |
| 3 | 65 | 225 | 222-237 | 231 |
| 4 | 60 | 218 | 218-237 | 231 |
| 5[5] | 80 | 67 | 196-237 | 228 |
| 6 | 80 | 224 | 221-237 | 232 |
| 7 | 80 | 202 | 202-229 | 214 |
| 7.5 | 60 | 221 | 221-239 | 229 |
| C3 | 80 | 194 | 194-201 | 198 |
| C4 | 80 | 194 | 193-202 | 198 |
| 8 | 80 | 196 | 195-204 | 199 |
| 9 | 80 | 197 | 197-205 | 200 |
| 10 | 17 | 225 | 217-235 | 224 |
| 11 | 17 | 223 | 219-234 | 224 |
| 12 | 18 | 223 | 221-230 | 227 |
| C5 | 80 | 184 | 184-197 | 190 |
| 13 | 9 | 216 | 214-218 | 216 |
| 14 | 9 | 224 | 218-224 | 220 |
| 15 | 11 | 226 | 220-226 | 222 |
| 16 | 15 | 214 | 214-227 | 220 |

[1]measured from time of catalyst addition to time heat source was removed from reaction flask
[2]lowest and highest temperature recorded from time catalyst was added until the heat source was removed
[3]average of values recorded from time catalyst was added until the time the heat source was removed
[4]data reported from the first recorded reaction temperature (215° C.) [5 minutes after heat was applied] until heat source was removed
[5]all components were charged to the reactor before heating; the time reported is measured from when heat was applied.

TABLE IIA

DIRECT ESTERIFICATION OF A DIACID WITH 1,4-BUTANEDIOL

| Eq. | Acidity | | | | | | Acid Conversion (%) | | | | | |
|---|---|---|---|---|---|---|---|---|---|---|---|---|
| | 10 min | 20 min | 30 min | 40 min | 50 min | 60 min | 10 min | 20 min | 30 min | 40 min | 50 min | 60 min |
| C1 | 1804 | 1563 | 2555 | 1852 | 1372 | 953 | 45.9 | 53.3 | 22.2 | 44.4 | 59.2 | 71.8 |
| C2 | 2090 | 2884 | 3172 | 1921 | 1061 | 552 | 71.2 | 60.0 | 55.4 | 73.6 | 85.7 | 92.6 |
| 1 | 2872 | 1407 | 18 | 69 | 54 | 52 | 53.0 | 77.6 | 99.7 | 98.9 | 99.2 | 99.2 |
| 2[1] | 390 | 25 | 1 | 44 | 21 | 43 | 92.1 | 99.5 | 100 | 99.1 | 99.6 | 99.1 |
| 3[1] | 1088 | 5 | 5 | 5 | ND | 7 | 72.8 | 99.9 | 99.9 | 99.9 | 100 | 99.8 |
| 4 | 512 | 2 | 7 | ND | ND | ND | 85.0 | 99.9 | 99.8 | 100 | 100 | 100 |
| 5 | 380 | ND | ND | ND | ND | ND | 89.3 | 100 | 100 | 100 | 100 | 100 |
| 6 | 1303 | ND | ND | ND | ND | ND | 61.3 | 100 | 100 | 100 | 100 | 100 |
| 7 | 473 | 450 | 771 | 857 | 700 | 137 | 86.2 | 86.8 | 77.3 | 74.7 | 79.4 | 96.0 |
| 7.5 | 1215 | 1065 | 1151 | 471 | 137 | 52 | 63.9 | 68.5 | 65.9 | 86.2 | 96.0 | 98.5 |

[1]Acidity measured and Acid Conversion determined at 15, 25, 35, 45, 55, and 65 minutes, respectively.
ND = none detected

TABLE IIB

DIRECT ESTERIFICATION OF A DIACID WITH ETHYLENE GLYCOL

| Eq. | 10 min | 20 min | 30 min | 40 min | 50 min | 60 min | 70 min | 80 min |
|---|---|---|---|---|---|---|---|---|
| | Acidity | | | | | | | |
| C3 | 1052 | 1792 | 1868 | 3161 | 2334 | 3743 | 1534 | 1072 |
| C4 | 1871 | 1239 | 1309 | 2965 | 3479 | 1639 | 662 | 707 |
| 8 | 1838 | 2450 | 3864 | 878 | 598 | 578 | 90 | 88 |
| 9 | 2462 | 1940 | 1998 | 700 | 444 | 546 | ND | ND |
| | Acid Conversion (%) | | | | | | | |
| C3 | 76.4 | 59.2 | 57.4 | 26.2 | 46.3 | 11.6 | 65.3 | 76.0 |
| C4 | 57.4 | 72.1 | 70.5 | 31.0 | 18.3 | 62.8 | 85.2 | 84.2 |
| 8 | 58.1 | 43.6 | 8.5 | 80.4 | 86.7 | 87.1 | 98.9 | 98.1 |
| 9 | 43.3 | 55.7 | 54.3 | 84.4 | 90.1 | 87.9 | 100 | 100 |

ND = none detected

EXAMPLES 4, C5

Effect of Temperature on Reaction Rate

In Example 4 (reported earlier and repeated here) and Example C5, the reaction temperature was varied to determine the effect of temperature on reaction rate. The results are reported in TABLE IV, below, and the compositions are reported in TABLE I, above. In Example 4, the average reaction temperature was about 231° C., as measured from the time the catalyst compound was added. In Example C5, the average reaction temperature was about 189° C. The results show that if the average reaction temperature is too low, the reaction proceeds much slower than when the average temperature is in the range of 190° C. to 240° C.

TABLE IV

EFFECT OF TEMPERATURE ON REACTION RATE

| Eq. | Acidity | | | | | | | | Acid Conversion (5) | | | | | | | |
|---|---|---|---|---|---|---|---|---|---|---|---|---|---|---|---|---|
| | 10 min | 20 min | 30 min | 40 min | 50 min | 60 min | 70 min | 80 min | 10 min | 20 min | 30 min | 40 min | 50 min | 60 min | 70 min | 80 min |
| 4 | 512 | 2 | 7 | ND | ND | ND | NM | NM | 85.0 | 99.9 | 99.8 | 100 | 100 | 100 | NM | NM |
| C5 | 1347 | 875 | 1180 | 1312 | 1286 | 706 | 336 | 38 | 59.9 | 74.2 | 65.0 | 61.0 | 61.8 | 79.2 | 90.2 | 98.9 |

ND = none detected
NM = not measured

EXAMPLES 10-12

Measurement of Acid Conversion Every Two Minutes

In Examples 10-12, samples were removed from the reaction vessel every two minutes to monitor the progress of the reaction. The results are reported in TABLE III, below, and the compositions are reported in TABLE IA, above. After only fifteen minutes, greater than 95 percent acid conversion was achieved for each example.

EXAMPLES 13-15

Acid Conversion at Different Times for Similar Reactions

In Examples 13-15, three reactions were run on identical compositions, said compositions being in TABLE I, above. Each reaction was stopped by removing heat after the time specified in TABLE V, said time being measured from the time at which catalyst was added to the reaction mixture, and then quenching with ice. A sample was collected for testing. The results, as re-

TABLE III

MEASUREMENT OF ACID CONVERSION EVERY TWO MINUTES

| Eq. | Acidity | | | | | | | | Acid Conversion (%) | | | | | | | |
|---|---|---|---|---|---|---|---|---|---|---|---|---|---|---|---|---|
| | 3 min | 5 min | 7 min | 9 min | 11 min | 13 min | 15 min | 17 min | 3 min | 5 min | 7 min | 9 min | 11 min | 13 min | 15 min | 17 min |
| 10 | 1501 | 1673 | 1087 | 992 | 385 | 93 | 37 | 11 | 55.2 | 49.9 | 67.8 | 70.7 | 88.7 | 97.3 | 98.9 | 99.7 |
| 11 | 309 | 626 | 951 | 958 | 99 | 435 | 91 | 24 | 91.0 | 81.6 | 71.9 | 71.7 | 97.1 | 87.3 | 97.4 | 99.5 |
| | 4 min | 6 min | 8 min | 10 min | 12 min | 14 min | 16 min | 18 min | 4 min | 6 min | 8 min | 10 min | 12 min | 14 min | 16 min | 18 min |
| 12 | 1793 | 1453 | 1906 | 1008 | 580 | 326 | 193 | 27 | 46.2 | 56.7 | 42.7 | 70.2 | 83.0 | 90.5 | 94.4 | 99.4 | ported in TABLE V, show that greater than 99% of the diacid ends were esterified after only 11 minutes

TABLE V

ACID CONVERSION IN SIMULTANEOUSLY CONDUCTED REACTIONS

| Example | Time (minutes) | Acidity | Acid Conversion (%) |
|---|---|---|---|
| 13 | 9 | 717 | 78.9 |
| 14 | 11 | 15 | 99.6 |
| 15 | 15 | 1 | 99.9+ |

EXAMPLE 16

Measurement of the Percentage of BDO Converted to THF

In Examples 16A–16D, the percentage of butanediol converted to THF was measured. Measurements were made on the distillate collected from the reaction. The distillate was collected throughout the reaction, until the reaction was complete. The compositions are described in TABLE I, above. The results are reported in TABLE VI, below. The percent BDO that was converted to THF was determined by standard gas chromatography on the distillate that was collected during the reaction. The distillate contained mostly water, BDO, and THF. From the results of the gas chromatography on the distillate, the percentage of THF in the distillate was determined. The percentage of THF in the distillate was converted to moles of THF. The weight of the BDO, as initially charged into the reaction vessel, was converted to moles of BDO. The percentage of BDO converted to THF was determined by the following formula:

$$\frac{\text{moles THF}}{\text{moles BDO}} (100\%) = \% \text{ BDO to THF}$$

The results, as reported in TABLE VI, show that less than 5% of the BDO was converted to THF.

TABLE VI

MEASUREMENT OF THE PERCENTAGE OF BDO CONVERTED TO THF

| Eq. | Compln. from TABLE I | Reaction Time (min) | % THF | Wt. distillate | Wt. THF | Moles THF[1] | Wt. BDO | Moles BDO | % BDO to THF |
|---|---|---|---|---|---|---|---|---|---|
| 16A | 2 | 66 | 5.60 | 2.87 | 0.1607 | 2.23 | 14.39 | 0.16 | 1.40 |
| 16B | 1 | 60 | 0.27 | 3.05 | 0.0082 | 0.11 | 12.16 | 0.13 | 0.08 |
| 16C | 10 | 18 | 12.46 | 1.96 | 0.2442 | 3.39 | 17.09 | 0.19 | 1.79 |
| 16D | 8 | 17 | 5.36 | 1.75 | 0.0938 | 1.30 | 16.84 | 0.19 | 0.70 |

[1] moles THF × $10^{-3}$

EXAMPLE 17

Polycondensation of Direct Esterification Reaction Product

In Example 17, 6.36 grams TPA and 16.84 grams BDO were charged into a stirred reaction vessel at atmospheric pressure. The components were stirred and the resultant reaction mixture was heated with an oil bath having an initial temperature of about 268° C. After 10 minutes, when the bath temperature was about 250° C., 0.445 ml of catalyst A was added. Approximately 19 minutes thereafter, pressure was reduced from atmospheric to 144 mm Hg. Over the next approximately 56 minutes, the pressure was reduced to 1 mm Hg and the reaction was stopped about 75 minutes after the catalyst was added by lowering the bath and breaking the vacuum with nitrogen. The product resulting therefrom was a high molecular polymer. The inherent viscosity of the polymer was 0.50. It was measured by dissolving 0.1 g of polymer in 100 ml of m-cresol at 30° C. An inherent viscosity of 0.50 corresponds to a weight average molecular weight of about 33,300 and a number average molecular weight of about 16,650. This example illustrates that the direct esterification product can be polycondensed to high molecular weight polymer.

I claim:

1. A process for directly esterifying greater than 95 percent of the acid ends of a diacid comprising the steps of:
   (a) mixing the diacid with 1,4-butanediol at a 1,4-butanediol:diacid molar ratio of at least 2:1 to form a reaction mixture,
   (b) heating the reaction mixture to about 180°C.,
   (c) adding to the heated reaction from $0.13 \times 10^{-3}$ to $5.2 \times 10^{-3}$ moles of a catalyst compound per mole of the diacid, said catalyst compound being selected from the group consisting of organo-tin, organo-titanium, and organo-zirconium compounds, and
   (d) reacting the reaction mixture, at atmospheric pressure, at an average reaction temperature ranging from 180° C. to 245° C. for a period of time no longer than sixty minutes from the time at which the catalyst compound was added to the reaction mixture to form a directly esterified diacid product.

2. A process for directly esterifying greater than 95 percent of the acid ends of a diacid comprising the steps of:
   (a) mixing the diacid with ethylene glycol an ethylene glycol:diacid molar ratio of at least 2:1 to form a reaction mixture,
   (b) heating the reaction mixture to about 180° C.,
   (c) adding to the reaction mixture from $0.13 \times 10^{-3}$ to $5.2 \times 10^{-3}$ moles of a neat catalyst compound per mole of the diacid, said neat catalyst compound being selected from the group consisting of organo-tin, organo-titanium, and organo-zirconium compounds, and
   (d) reacting the reaction mixture, at atmospheric pressure, at an average reaction temperature ranging from 190° C. to 200° C. for a period of time no longer than seventy minutes from the time at which the catalyst compound is added to the reaction mixture to form a directly esterified diacid product.

3. The process of claim 1 wherein the catalyst compound of step (c) is added during step (a) to form the reaction mixture.

4. The process of claim 2 wherein the neat catalyst compound of step (c) is added during step (a) to form the reaction mixture.

5. The process of claim 1 or claim 2 wherein the diacid is selected from the group consisting of aromatic diacids and aliphatic diacids.

6. The process of claim 1 or claim 2 wherein the diacid is terephthalic acid or adipic acid.

7. The process of claim 1 or claim 2 wherein the diacid is terephthalic acid.

8. The process of claim 1 wherein the catalyst compound is tetrabutyl titanate or n-butylstannic acid.

9. The process of claim 2 wherein the neat catalyst compound is tetrabutyl titanate or n-butylstannic acid.

10. The process of claim 1 wherein the ratio of 1,4-butanediol:diacid ranges from 4:1 to 6:1.

11. The process of claim 2 wherein the ratio of ethylene glycol:diacid ranges from 4:1 to 6:1.

12. The process of claim 1 wherein the average reaction temperature ranges from 220° C. to 230° C.

13. The process of claim 1 wherein the amount of the catalyst compound added is from $0.39 \times 10^{-3}$ to $1.7 \times 10^{-3}$ moles of catalyst compound per mole of diacid.

14. The process of claim 2 wherein the amount of the neat catalyst compound added is from $0.39 \times 10^{-3}$ to $1.7 \times 10^{-3}$ moles of catalyst compound per mole of diacid.

15. The process of claim 1 wherein the reaction mixture is reacted for a period of time no longer than thirty minutes.

16. The process of claim 1 wherein the reaction mixture is reacted under pressure at a temperature no greater than 270° C.

17. The process of claim 2 wherein the reaction mixture is reacted under pressure.

18. A semi-continuous method for directly esterifying a diacid with a glycol in the presence of a catalyst compound selected from the group consisting of organo-tin, organo-titanium, and organo-zirconium compounds and for polycondensing the resultant direct esterification reaction product comprising the steps of
  (a) preparing a reaction mixture by mixing the diacid, the glycol, and the catalyst together and heating to a reaction temperature of at least 180° C. or alternatively, preparing a reaction mixture by mixing the diacid and the glycol together, heating to a reaction temperature near 180° C., and adding thereto the catalyst compound, in a batch reactor, the glycol:diacid motor ratio being at least 2:1,
  (b) reacting the reaction mixture at an average reaction temperature ranging between 180° C. to 245° C. at atmospheric pressure until greater than 95% of the acid ends of the diacid are directly esterified,
  (c) passing the reacted reaction mixture through a heat exchanger at a temperature of about 100° C. to 150° C. in order to cool said mixture,
  (d) passing the cooled reaction mixture into an apparatus that provides storage capacity and that allows for continuous outflow of the reaction mixture,
  (e) passing the reaction mixture from the storage apparatus into a heating apparatus where the mixture is heated to at least 250° C., under vacuum, and polycondensed to high molecular weight polymer or passed into a separate apparatus for polycondensation.

* * * * *

UNITED STATES PATENT AND TRADEMARK OFFICE
CERTIFICATE OF CORRECTION

PATENT NO. : 5,015,759

DATED : May 14, 1991

INVENTOR(S) : David J. Lowe

It is certified that error appears in the above—identified patent and that said Letters Patent is hereby corrected as shown below:

Claim 18, column 16, line 16, delete "motor" and insert in place thereof --molar--.

Signed and Sealed this

Eighth Day of December, 1992

Attest:

DOUGLAS B. COMER

Attesting Officer

Acting Commissioner of Patents and Trademarks